Aug. 11, 1931.    G. R. RIGGS ET AL    1,818,814
ELECTRICAL OUTLET BOX SUPPORT
Filed May 12, 1930

WITNESS

INVENTOR
G. R. Riggs,
BY C. F. Spreen,

ATTORNEY

Patented Aug. 11, 1931

1,818,814

UNITED STATES PATENT OFFICE

GREELEY R. RIGGS AND CHARLES F. SPREEN, OF AUSTIN, TEXAS

ELECTRICAL OUTLET BOX SUPPORT

Application filed May 12, 1930. Serial No. 451,765.

Our invention relates to supports or brackets for electrical outlet boxes and an object of the same is to provide a device of this character which may be employed to support the outlet box directly from the ceiling sheeting or from a suitable header.

Another object of the invention is to provide an outlet box support having means whereby the box may be adjusted laterally and securely held in adjusted position.

The invention further contemplates a bracket of this character embodying a pair of supporting elements for the box and a yoke for securing the box against vertical displacement.

Figure 1:
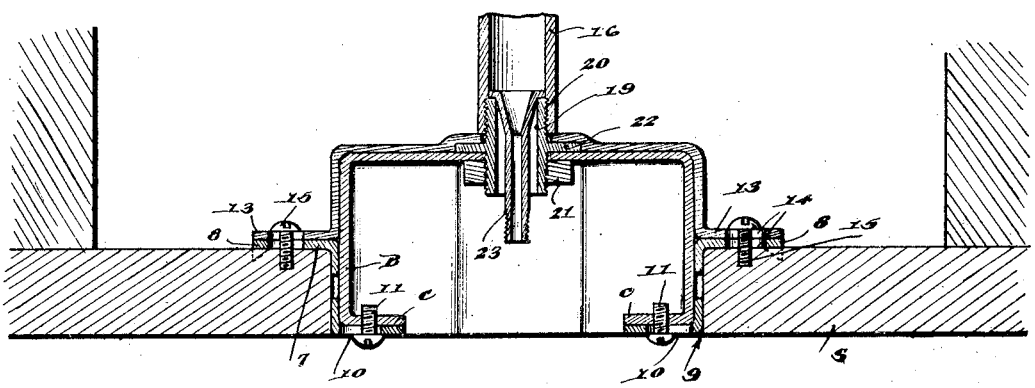
Figure 2:
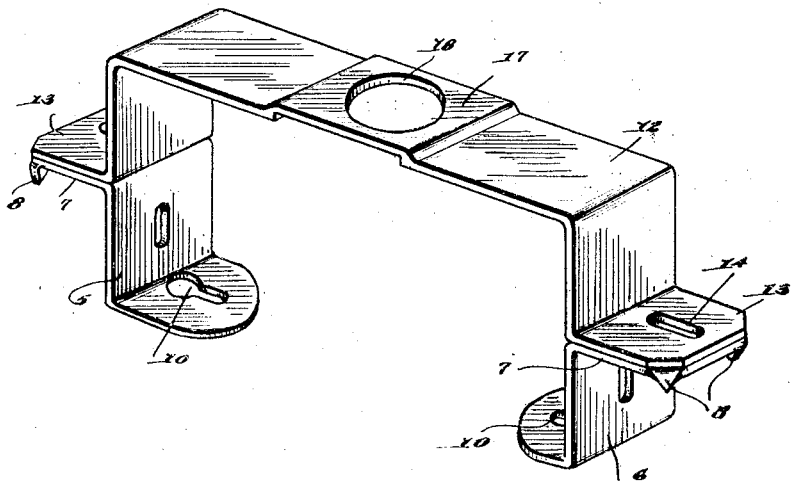

With the preceding and other objects and advantages in mind, the invention consists in the novel combination of elements, constructions and arrangements of parts and operations to be hereinafter more fully described, claimed and illustrated in the accompanying drawings, wherein:

Figure 1 is a vertical sectional view of the invention in operative position; and Fig. 2 is a perspective of the device.

Referring to the invention in detail a pair of identical L-shaped brackets 5 and 6 is provided. Each of these brackets is formed with a right angularly extending attaching arm 7 which is formed with barbs 8. As disclosed in Fig. 1 these brackets 5 and 6 are arranged within an opening 9 in the ceiling sheeting in transverse alinement and with the arms 7 resting upon the upper face of the sheetings. These barbs 8 are driven into the sheeting S to anchor the bracket in place. The usual outlet box B is arranged with its ears C resting upon the horizontal legs of the brackets 5 and 6. These legs of the brackets are provided with key-slots 10 through which screws 11 pass and engage the ears C. The slots 10 permit the box C to be shifted laterally and secured in any desired position in the opening 9 when a smaller box than the one shown is employed.

For the purpose of clamping the box B in place an inverted U-shaped yoke 12 embraces the upper and side walls of the box and is provided with lateral extensions 13 upon the ends of the vertical legs which are superimposed upon the arms 7. The extensions 13 and 7 are provided with coinciding slots 14 and passing therethrough and engaged with the sheeting S are suitable screws 15. In order to couple a vertically extending conduit 16 to the box B the horizontal leg of the yoke 12 is formed with a raised or offset central portion 17 provided with an opening 18. A threaded nipple 19 extends through the opening 18 and through a registering opening in the upper wall of the box and has threaded engagement with the lower end of the conduit as at 20. A lock nut 21 is threaded upon the lower end of this nipple and engages the under face of the upper wall of the box as shown. The nipple 19 is formed with a flange 22 which rests upon the upper face of the top wall of the box and lies within the raised or offset portion 17. The usual electrical fixture supporting standard 23 is supported from the upper end of the nipple as shown.

What is claimed is:

1. In an electrical outlet box support, a pair of brackets to be arranged at opposite sides of an opening in which the outlet box is received, a laterally extending attaching arm on the upper end of each bracket adapted to be secured to a support, an inwardly extending leg on the other end of each bracket, and fastenings for securing the inwardly extending legs of the brackets to the outlet box, and a yoke of substantially U-shaped formation adapted to embrace the box, and means for securing the yoke to the arms.

2. In an outlet box support, a pair of brackets to be arranged in horizontal alinement and upon which the outlet box is adapted to rest, a laterally extending attaching arm carried by the upper end of each of the brackets, an inverted U-shaped yoke adapted to embrace the box and having its terminals formed with lateral extensions which rest upon the attaching elements, and fastenings passing through the extensions and attaching elements for securing the parts in place.

3. In a support for an electrical outlet box having attaching ears, a pair of brackets to be arranged at opposite sides of an opening in which the outlet box is received, each of said brackets comprising a pair of oppositely extending substantially parallel arms and a web portion connecting one end of each of said arms, one of said arms of each pair being secured to a support at either side of said opening, the other arm of each pair extending into said opening and being secured to the ears of the outlet box.

4. In a support for mounting an outlet box within an opening in a wall sheeting, a pair of brackets to be arranged at opposite sides of said opening, each of said brackets comprising a web portion bridging the thickness of said sheeting, a laterally extending arm formed with one end of said web and engaged behind said sheeting, and an arm formed with the other end of each of said webs and extending into said opening for attachment to the outlet box, the arms at opposite ends of each web being substantially parallel.

GREELEY R. RIGGS.
CHARLES F. SPREEN.